United States Patent
Takayanagi et al.

(10) Patent No.: US 9,573,208 B2
(45) Date of Patent: Feb. 21, 2017

(54) PORTABLE WORKING MACHINE

(71) Applicant: MAKITA CORPORATION, Aichi (JP)

(72) Inventors: Yoshiaki Takayanagi, Tokyo (JP);
Masashi Sugiyama, Tokyo (JP)

(73) Assignee: MAKITA CORPORATION, Aichi (JP)

( * ) Notice: Subject to any disclaimer, the term of this patent is extended or adjusted under 35 U.S.C. 154(b) by 179 days.

(21) Appl. No.: 14/203,995

(22) Filed: Mar. 11, 2014

(65) Prior Publication Data
US 2014/0290074 A1    Oct. 2, 2014

(30) Foreign Application Priority Data

Mar. 29, 2013  (JP) .................................. 2013-074906

(51) Int. Cl.
*B23D 57/00*     (2006.01)
*B23D 57/02*     (2006.01)

(52) U.S. Cl.
CPC .................................... *B23D 57/023* (2013.01)

(58) Field of Classification Search
CPC ..... B27B 17/00–17/0033; B27B 17/02–17/14; B23D 57/023
USPC .................................................... 30/381–387
See application file for complete search history.

(56) References Cited

U.S. PATENT DOCUMENTS

| | | | | |
|---|---|---|---|---|
| 3,636,995 A | * | 1/1972 | Newman | B27B 17/14 30/386 |
| 3,839,795 A | * | 10/1974 | Dooley | B27B 17/083 30/383 |
| 4,316,327 A | * | 2/1982 | Scott | B27B 17/14 30/386 |
| 4,819,332 A | * | 4/1989 | Sugihara | B27B 17/12 30/383 |

(Continued)

FOREIGN PATENT DOCUMENTS

| | | |
|---|---|---|
| DE | 10124080 | 2/2002 |
| EP | 2777901 | 9/2014 |

(Continued)

OTHER PUBLICATIONS

German Official Action for App. No. DE102014004063.1 dated Nov. 18, 2014, along with an English-language translation thereof.

(Continued)

*Primary Examiner* — Jason Daniel Prone
(74) *Attorney, Agent, or Firm* — Greenblum & Bernstein, P.L.C.

(57) ABSTRACT

A portable working machine includes a working machine body, bolt members erected on the working machine body, a cover member configured to be attachable to and detachable from the working machine body, in which the cover member has through-holes through which the bolt members are inserted when attaching the cover member, fixing members configured to be fastened to the bolt members to fix the cover member attached to the working machine body, and a (Continued)

holding member attached to an outer surface of the cover member with a predetermined gap space between the holding member and the outer surface of the cover member, in which the holding member is configured to retain the fixing members on an outer side of the outer surface of the cover member when a fastening of the fixing members to the bolt members is released to prevent the fixing members from dropping off the cover member.

14 Claims, 7 Drawing Sheets

(56) References Cited

U.S. PATENT DOCUMENTS

| | | | | |
|---|---|---|---|---|
| 5,249,362 | A * | 10/1993 | Harding | F16B 2/065 30/381 |
| 5,345,686 | A * | 9/1994 | Zimmermann | B27B 17/14 30/383 |
| 5,353,506 | A * | 10/1994 | Muller | B27B 17/02 30/383 |
| 5,709,254 | A * | 1/1998 | Argue | A01G 23/091 30/386 |
| 5,896,670 | A * | 4/1999 | Gibson | B27B 17/14 30/386 |
| 5,901,457 | A * | 5/1999 | Harding | G01B 3/02 30/383 |
| 5,983,508 | A * | 11/1999 | Sundstrom | B27B 17/14 30/383 |
| 6,237,228 | B1 * | 5/2001 | Moody | B27B 17/14 30/381 |
| 6,493,949 | B2 * | 12/2002 | Kondo | B27B 17/14 30/383 |
| 6,560,879 | B2 * | 5/2003 | Franke | B27B 17/14 30/383 |
| 6,694,623 | B1 * | 2/2004 | Haughey | B27B 17/14 30/386 |
| 6,877,233 | B1 * | 4/2005 | Franke | B27B 17/14 30/383 |
| 7,434,502 | B2 * | 10/2008 | Keeton | B27B 17/14 30/386 |
| 7,481,000 | B2 * | 1/2009 | Tynes | B27B 17/14 30/386 |
| 8,132,484 | B2 * | 3/2012 | Pfleiderer | B27B 17/02 30/383 |
| 8,136,256 | B2 * | 3/2012 | Wolf | B27B 17/02 30/381 |
| 8,353,110 | B2 * | 1/2013 | Galster | B27B 17/14 30/381 |
| 8,615,889 | B2 * | 12/2013 | Martinsson | B27B 17/14 30/383 |
| 8,615,890 | B2 * | 12/2013 | Wolf | B27B 17/02 30/383 |
| 2001/0042311 | A1 | 11/2001 | Kondo et al. | |
| 2007/0062361 | A1 * | 3/2007 | Xiong | B27B 17/14 83/814 |
| 2013/0086810 | A1 * | 4/2013 | Peterson | B27B 17/14 30/386 |
| 2013/0091715 | A1 * | 4/2013 | Zimmermann | B28D 1/082 30/382 |
| 2013/0318802 | A1 * | 12/2013 | Kapinsky | B23D 59/006 30/383 |
| 2014/0250702 | A1 * | 9/2014 | Zimmermann | B27B 17/14 30/386 |
| 2015/0059191 | A1 * | 3/2015 | Takahashi | B27B 17/14 30/386 |
| 2015/0273721 | A1 * | 10/2015 | Harer | B23D 59/006 30/383 |

FOREIGN PATENT DOCUMENTS

| | | |
|---|---|---|
| JP | 5-000874 | 1/1993 |
| JP | 2011-500338 | 1/2011 |
| JP | 2011-075076 | 4/2011 |
| JP | 2012-213914 | 11/2012 |
| WO | WO2009/048356 | 4/2009 |

OTHER PUBLICATIONS

Japanese Official Action for counterpart application No. 2013-074906 dated Jul. 12, 2016, along with an English-language translation thereof.

Japanese Official Action for counterpart application No. 2013-074906 dated Nov. 1, 2016, along with an English-language translation thereof.

* cited by examiner

PORTABLE WORKING MACHINE

CROSS-REFERENCE TO RELATED APPLICATION

The application claims priority to Japanese Patent Application No. 2013-074906 filed on Mar. 29, 2013, the entire contents of which are incorporated herein by reference.

BACKGROUND OF THE INVENTION

1. Field of the Invention

The present invention relates to a portable working machine having a cover member that is detachably attached to a working machine body.

2. Description of Related Art

A chain saw as a type of portable working machine has a saw chain driven by a motor (such as an engine and an electric motor) and a guide bar guiding the saw chain. The saw chain and the guide bar are configured to be detachably (replaceably) attached to a chain saw body and are, in general, fixedly attached to the chain saw body as follows.

That is, the guide bar is first attached to the chain saw body by inserting a stud bolt or the like, vertically provided to the chain saw body, through a through-hole or a notch formed in the guide bar. Next, the saw chain is attached to a periphery of the guide bar, and after that, a side cover (for example, a chain cover) is attached to the chain saw body by inserting the stud bolt or the like through a through-hole formed in the side cover. Then, the nut is screwed with the stud bolt or the like to be fastened, whereby the guide bar and the side cover are fixed to the chain saw body (for example, see Japanese Laid-open (Kokai) Patent Application Publication No. 2012-213914).

In the chain saw, when the saw chain and the guide bar are inspected and replaced if necessary, it is required to detach the side cover by loosening the nut. At this time, since the nut of which fastening to the stud bolt or the like is released is in a state of being separated from the side cover, the nut may be dropped. Thus, the workability of the chain saw is not necessarily good, and therefore, it is required to improve the workability thereof. Furthermore, in a portable working machine such as a chain saw, the inspection and replacement if necessary may be performed at a site such as in the mountains, and if the nut is dropped in such a site, the nut may also be lost.

Note that the abovementioned problem is not limited to the chain saw, and the problem is common to portable working machines having a cover member detachably attached to a working machine body, particularly in portable working machines of which components are inspected and replaced if necessary in such a state in which a cover member is detached.

SUMMARY OF THE INVENTION

Therefore, taking into consideration the abovementioned problem, according to an aspect of the present invention, a portable working machine includes: a bolt member vertically provided to a working machine body; a detachable cover member having a through-hole and attached to the working machine body by inserting the bolt member through the through-hole; a fixing member screwed with the bolt member and fixing the cover member to the working machine body; and a holding member which holds the fixing member on an outer side of the cover member to prevent the fixing member of which fastening to the bolt member is released from dropping, and the holding member being attached to an outer surface of the cover member while having a predetermined gap space between the holding member and the outer surface of the cover member.

Other objects and features of aspects of the present invention will be understood from the following description with reference to the accompanying drawings.

DESCRIPTION OF THE PREFERRED EMBODIMENTS

Hereinbelow, embodiments of the present invention will be described with reference to the accompanying drawings.

First Embodiment

Figure 1:
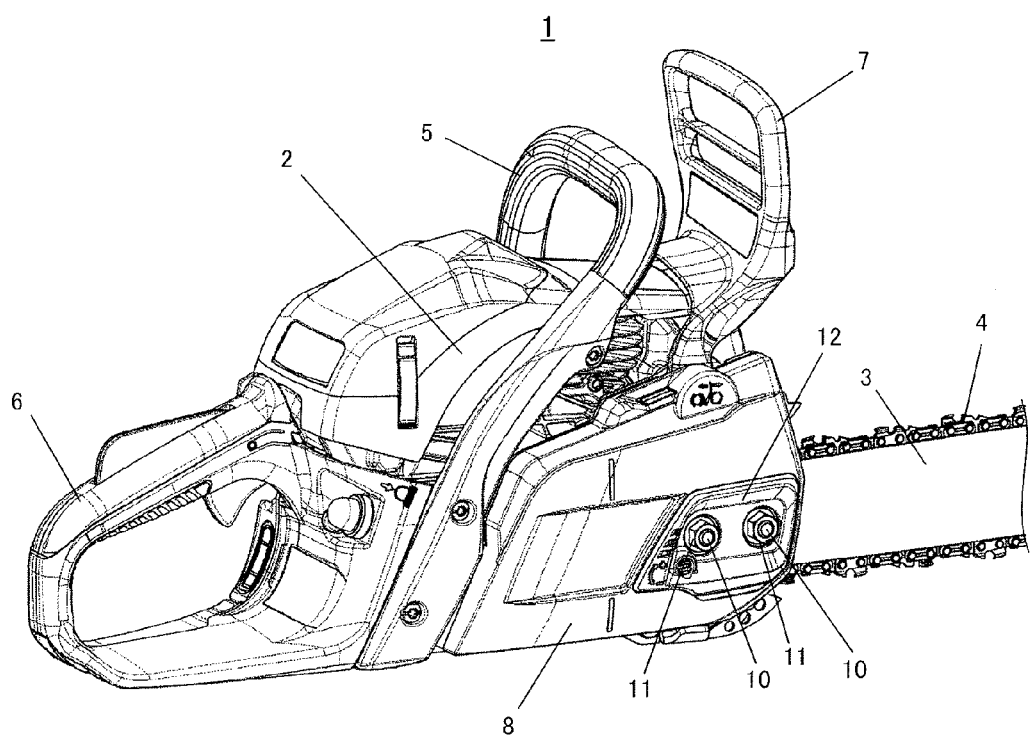
FIG. 1 is a view showing an overall configuration of a chain saw according to a first embodiment.

FIG. 1 shows an overall configuration of a chain saw (portable working machine) according to a first embodiment of the present invention. As shown in FIG. 1, a chain saw 1 according to the first embodiment has a chain saw body 2 including: a motor (not shown) such as an engine and an electric motor; and a sprocket (not shown) rotated and driven by the motor, a guide bar 3 extending forward (rightward in FIG. 1) from the chain saw body 2, a saw chain 4 wrapped around a periphery of the guide bar 3, a front handle 5 provided at an upper portion of the chain saw body 2, a rear handle 6 provided at a rear of the chain saw body 2, and a front guard (chain brake actuating lever) 7 provided at the front of the front handle 5.

The rear side of the saw chain 4 is wound around the sprocket, and the saw chain 4 runs on the periphery of the guide bar 3 accompanying rotation of the sprocket. The rear side of the guide bar 3 is fixed to the chain saw body 2, and the guide bar 3 guides the running saw chain 4 by a guide groove formed in the periphery. The sprocket and the rear side of the guide bar 3 are covered by a chain cover 8.

The chain cover 8 is fixed to the chain saw body 2 by a nut member 11 screwed with a bolt member 10 vertically provided to the chain saw body 2. Specifically, when the chain cover 8 is attached to the chain saw body 2, the tip end portion of the bolt member 10 penetrates through the chain cover 8 to be exposed. The nut member 11 is screwed to the tip end portion of the exposed bolt member 10 to be fastened, whereby the chain cover 8 is fixed to the chain saw body 2. At this time, the guide bar 3 is also fastened and fixed between the chain saw body 2 and the chain cover 8. That is, the chain cover 8 and the guide bar 3 are fixed to the chain saw body 2 by the nut member 11 screwed with the bolt member 10.

Note that the bolt member 10 may be fixed or locked to the chain saw body 2, and, as examples of the bolt member 10, a stud bolt, an anchor bolt, and a bolt with a stopper are adopted. Furthermore, in this embodiment, although the two bolt members 10 are vertically provided to the chain saw body 2, the number of the bolt members 10 is not limited to two, and any number of the bolt members 10 (for example, the single bolt member 10) may be provided.

A stopper plate 12 is attached to an outer surface of the chain cover 8. The stopper plate 12 has a function of holding the nut member 11 of which fastening to the bolt member 10 is released so that drop of the nut member 11 is prevented. In this embodiment, the stopper plate 12 is attached to the chain cover 8 while having a predetermined gap space (gap space S to be described later) between the stopper plate 12 and the outer surface of the chain cover 8, and the nut member 11 of which fastening to the bolt member 10 is released is held on the outer side of the chain cover 8.

In the chain saw 1, when the guide bar 3 and the saw chain 4 are inspected and replaced if necessary, the nut member 11 is loosened to release the fastening to the bolt member 10, and the chain cover 8 is detached from the chain saw body 2. In this embodiment, the chain cover 8, the nut member 11, and the stopper plate 12 are previously integrated with each other to constitute a chain cover assembly, and when the guide bar 3 and the saw chain 4 are inspected and replaced if necessary, the chain cover assembly is detached. At this time, the nut member 11 of which fastening to the bolt member 10 is released is held by the stopper plate 12 to be prevented from dropping.

Note that, in this embodiment, the chain saw body 2 corresponds to the "working machine body" of the present invention, the chain cover 8 corresponds to the "cover member" of the present invention, the nut member 11 corresponds to the "fixing member" of the present invention, and the stopper plate 12 corresponds to the "holding member" of the present invention. Furthermore, the guide bar 3 corresponds to the "functional component" of the present invention.

Figure 2:
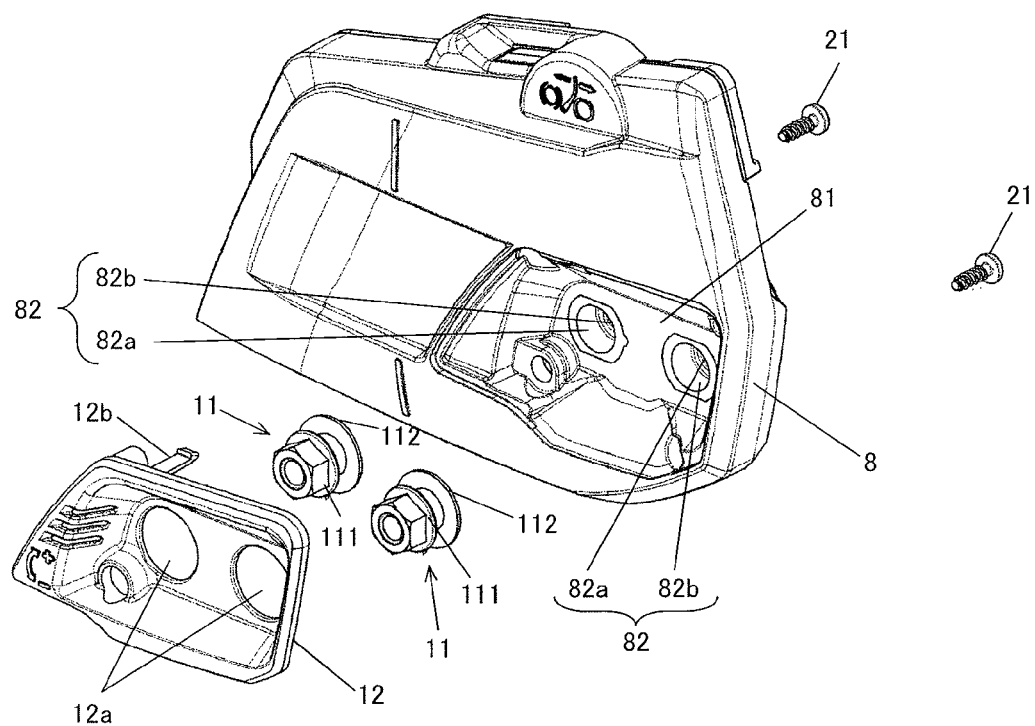
FIG. 2 is an exploded perspective view showing a chain cover assembly in the chain saw.
Figure 3:
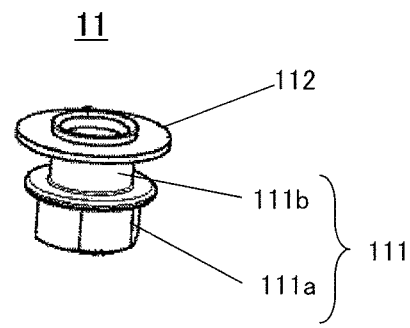
FIG. 3 is a view showing a configuration of a nut member of the chain cover assembly.

FIG. 2 is an exploded perspective view of the chain cover assembly, and FIG. 3 is a view showing a configuration of the nut member 11.

The outer surface of the chain cover 8 has a recessed attachment region 81 in which the nut member 11 and the stopper plate 12 are attached, and the attachment region 81 has at its bottom portion a stepped through-hole 82. The stepped through-hole 82 has a large diameter recessed portion 82a and a small diameter penetrating portion 82b, and the small diameter penetrating portion 82b is formed so that the bolt member 10 can be inserted therethrough (that is, so that the diameter of the penetrating portion 82b is greater than an outer diameter of the bolt member 10). Note that the stepped through-hole 82 may be directly formed in the chain cover 8 or may be indirectly formed by mounting other components on the chain cover 8.

Such a configuration is adopted that the chain cover assembly (the chain cover 8) is attached to the chain saw body 2 by inserting the bolt member 10 through the stepped through-hole 82 (the penetrating portion 82b), and at this time, the tip end portion of the bolt member 10 is exposed from the stepped through-hole 82 (the recessed portion 82a).

The nut member 11 has a nut member body 111 and a washer member 112.

The nut member body 111 has a nut portion 111a formed with a female screw corresponding to a male screw of the bolt member 10 and a cylindrical sleeve portion 111b extending from the nut portion 111a in a central axis direction of the nut portion 111a (see, FIG. 3).

In this embodiment, although the nut portion 111a is formed into a washer faced hexagonal nut shape, the shape of the nut portion 111a is not limited thereto.

The sleeve portion 111b is formed so that the outer diameter is smaller than the diameter of the recessed portion 82a of the stepped through-hole 82 (and greater than the diameter of the penetrating portion 82b), and the inner diameter is greater than the outer diameter of the bolt member 10. Furthermore, the sleeve portion 111b is formed so that the length is smaller than a depth of the recessed portion 82a of the stepped through-hole 82. According to this constitution, the sleeve portion 111b can accommodate the tip end portion of the bolt member 10 therein and also can enter into (can be inserted through) the recessed portion 82a of the stepped through-hole 82.

The washer member 112 is formed so that the outer diameter is greater than the diameter of the recessed portion 82a of the stepped through-hole 82, and the inner diameter is greater than the outer diameter of the sleeve portion 111b and mounted on the sleeve portion 111b. The tip end of the sleeve portion 111b is subjected to slip-off prevention processing (for example, flare processing) to prevent the mounted washer member 112 from dropping from the sleeve portion 111b. That is, the washer member 112 is mounted to the sleeve portion 111b of the nut member body 111 so as to be prevented from dropping from the sleeve portion 111b and movable in the axial direction of the sleeve portion 111b. Note that, although the washer member 112 is formed into a circular shape in this embodiment, the shape of the washer member 112 is not limited thereto.

The stopper plate 12 has a through-hole 12a corresponding to the stepped through-hole 82 of the chain cover 8. The through-hole 12a is formed so that the diameter is greater than the outer diameter of the nut portion 111a of the nut member body 111 and smaller than the outer diameter of the washer member 112. The stopper plate 12 is attached to the attachment region 81 of the chain cover 8 so as to face the bottom portion of the attachment region 81 at a predetermined interval from the bottom portion of the attachment region 81 and is fixed to the chain cover 8 by an engaging claw 12b of the stopper plate 12 and attachment screws 21. According to this constitution, most of portions of the attachment region 81 are covered by the stopper plate 12, and, at the same time, a gap space S (see, FIGS. 5 and 6 to be described later) is formed between the outer surface of the chain cover 8 (the bottom portion of the attachment region 81) and the stopper plate 12.

In this embodiment, the sleeve portion 111b of the nut member body 111 is first inserted through (inserted in) the recessed portion 82a of the stepped through-hole 82 of the chain cover 8, whereby the nut member 11 is mounted on the chain cover 8, and after that, the stopper plate 12 is attached and fixed to the chain cover 8. According to this constitution, the chain cover 8, the nut member 11, and the stopper plate 12 are integrated with each other (they become the chain cover assembly). Here, the nut member 11 is not connected to any of the chain cover 8 and the stopper plate 12 and is configured to be relatively movable in a predetermined range with respect to not only the chain cover 8 but also the stopper plate 12.

Furthermore, the nut portion 111a of the nut member 11 (the nut member body 111) is exposed from the through-hole 12a formed in the stopper plate 12, whereby a worker or the like can easily fasten or loosen the nut member 11.

The chain cover assembly (that is, the chain cover 8 integrated with the nut member 11 and the stopper plate 12) is attached and fixed to the chain saw body 2 as follows.

First, the bolt member 10 is inserted through the stepped through-hole 82 (the penetrating portion 82b of the stepped through-hole 82), and the chain cover assembly (the chain cover 8) is attached to the chain saw body 2 so that the tip end portion of the exposed bolt member 10 is accommodated inside the sleeve portion 111b of the nut member body 111. Note that, although description thereof will be omitted here, it is assumed that the guide bar 3 is previously attached to the chain saw body 2.

Next, the nut member body 111 (the nut portion 111a) of the nut member 11 is screwed with the bolt member 10 and fastened, whereby the chain cover assembly (the chain cover 8) is fixed to the chain saw body 2. Note that, at this time, the guide bar 3 is also fixed to the chain saw body 2.

Figure 4:
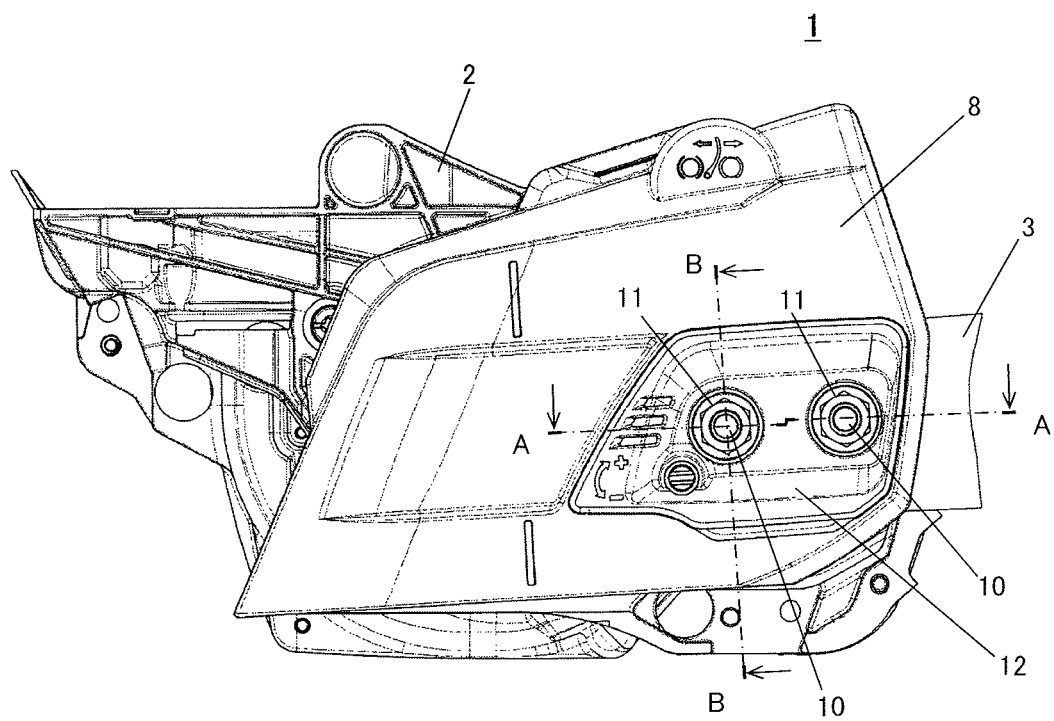
FIG. 4 is a right side view of a main part of the chain saw.
Figure 5:
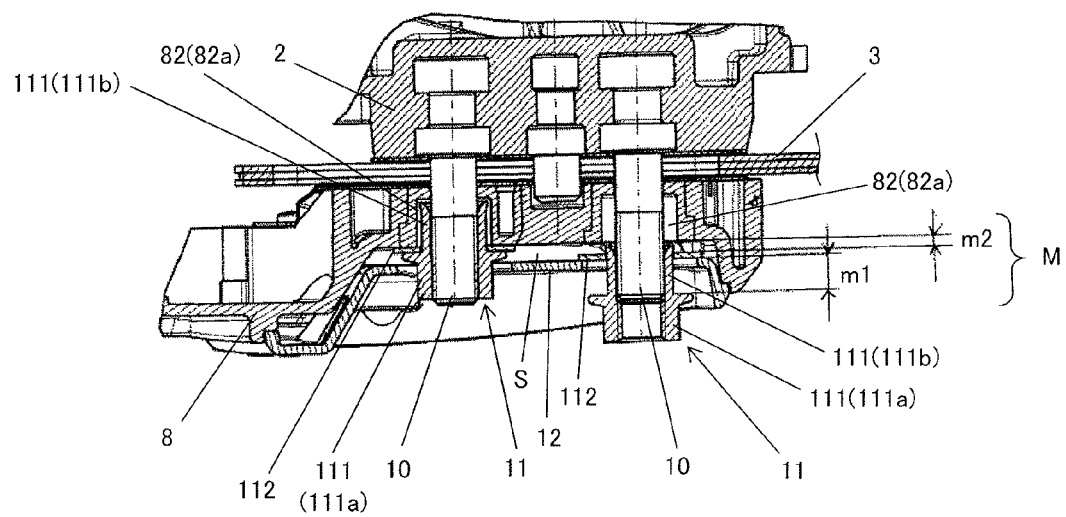
FIG. 5 is an A-A cross-sectional enlarged view of FIG. 4.
Figure 6:
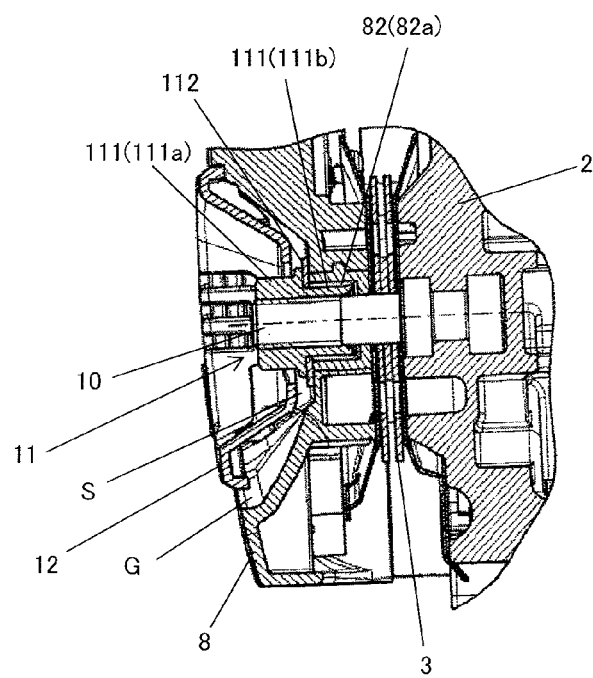
FIG. 6 is a B-B cross-sectional enlarged view of FIG. 4.

FIG. 4 is a right side view of a main part of the chain saw 1. FIG. 5 is an A-A cross-sectional enlarged view of FIG. 4. FIG. 6 is a B-B cross-sectional enlarged view of FIG. 4. Note that, in FIG. 5, the nut member 11 in a fastened state is shown on the left side, and the nut member 11 in a loosened state is shown on the right side for illustration purposes.

As described above, in the chain cover 8, the gap space S is formed between the outer surface of the chain cover 8 (the bottom portion of the attachment region 81) and the stopper plate 12, and the washer member 112 of the nut member 11 is disposed in the gap space S (see, FIGS. 5 and 6).

The chain cover 8 is attached to the chain saw body 2 in a state in which the guide bar 3 is sandwiched between the chain cover 8 and the chain saw body 2, and the chain cover 8 is fixed to the chain saw body 2 by fastening the nut member 11 (the nut member body 111) screwed with the bolt member 10. In a state in which the nut member 11 (the nut member body 111) is fastened, the sleeve portion 111b of the nut member body 111 enters into the recessed portion 82a of the stepped through-hole 82 while accommodating the tip end portion of the bolt member 10 therein. Furthermore, the washer member 112 is sandwiched between the outer surface of the chain cover 8 and the nut member body 111 (the nut portion 111a). In other words, the washer member 112 is located closest to the chain cover 8 side in the gap space S (see, the left side in FIG. 5).

Furthermore, the gap space S formed between the outer surface of the chain cover 8 and the stopper plate 12 communicates with the outside through a gap G also formed between the outer surface of the chain cover 8 and the stopper plate 12 (see, FIG. 6). The gap G is formed to extend obliquely downward from the gap space S and communicate with the outside on the lower side of the stopper plate 12, whereby dust and the like that has entered into the gap space S from the through-hole 12a of the stopper plate 12 are effectively discharged. Note that, in this embodiment, although the gap G for communicating the gap space S with the outside is mainly formed by a partial recessed portion provided on the chain cover 8 side, a recessed portion, a notch, or the like may be provided on the stopper plate 12 side to form the gap G.

When the nut member 11 (the nut member body 111) is loosened, the nut member body 111 moves on the bolt member 10 in the direction away from the chain saw body 2 to release the fastening to the bolt member 10. When the fastening of the nut member body 111 to the bolt member 10 is released, the chain cover 8 (the chain cover assembly) can be detached from the chain saw body 2, and accordingly, the guide bar 3 can also be detached from the chain saw body 2 (see, the right side in FIG. 5).

Here, in this embodiment, according to the abovementioned constitution, when the nut member 11 (the nut member body 111) is loosened, the nut member body 111 can move not only on the bolt member 10, but the nut member body 111 can move in the direction further away from the chain saw body 2 even after the fastening to the bolt member 10 is released. This fact also means that when the chain cover 8 is fixed to the chain saw body 2, the nut member body 111 moves in two steps in the direction approaching the chain saw body 2. That is, the nut member body 111 is configured to be movable in two steps in the axial direction of the bolt member 10, and the two step movement includes first movement in which the nut member body 111 moves in a state of being screwed with the bolt member 10 and second movement in which the nut member body 111 moves in such a state in which the fastening to the bolt member 10 is released.

Specifically, the nut member body 111 is configured to be movable in the axial direction of the bolt member 10 by an amount M (=m1+m2) obtained by adding a movable amount m2 (<m1) of the washer member 112 in the gap space S to an amount m1 in which the nut portion 111a moves on the bolt member 10 (in other words, a length of a portion of the bolt member 10 to which the nut member body 111 can be screwed) (see, the right side in FIG. 5). Here, the moving amount m1 of the nut portion 111a on the bolt member 10 corresponds to the moving amount according to the first movement, and the movable amount m2 of the washer member 112 in the gap space S corresponds to the moving amount according to the second movement.

Then, the nut member 11 moves in two steps in the direction in which the nut member body 111 is away from the chain saw body 2, and the washer member 112 is abutted against an inner surface of the stopper plate 12 (a surface facing the outer surface of the chain cover 8), whereby the nut member 11 is held to be prevented from dropping. That is, the nut member 11 of which fastening to the bolt member 10 is released is held on the outer side of the chain cover 8 (specifically, the outer side of the recessed portion 82a) by the stopper plate 12. At this time, the washer member 112 is located closest to the stopper plate 12 side (on the outermost side) in the gap space S.

The chain saw 1 according to this embodiment has the abovementioned configuration, and in the nut member 11 fixing the chain cover 8 and the guide bar 3 to the chain saw body 2, when the fastening of the nut member 11 to the bolt member 10 vertically provided to the chain saw body 2 is released, the nut member 11 is held by the stopper plate 12 to be prevented from dropping. Thus, the nut member 11 is not lost, and also since it is unnecessary to pay special attention to the drop of the nut member 11, the workability in the detachable chain cover 8 is enhanced.

Furthermore, the nut member 11 of which fastening to the bolt member 10 is released is held on the outer side of the chain cover 8 (on the outer side of the recessed portion 82a) by the stopper plate 12. Thus, the movable amount of the nut member 11 can be satisfactorily secured. For example, the chain cover assembly (the chain cover 8) is attached to the chain saw body 2 while adjusting the position, and after that, the nut member 11 can be fastened by being screwed to the bolt member 10. That is, the attachment of the chain cover assembly (the chain cover 8) to the chain saw body 2 and the fastening of the nut member 11 to the bolt member 10 are not required to be performed substantially simultaneously.

According to this constitution, a good workability can be secured particularly in the mounting of the chain cover 8. Furthermore, since the position of the nut member 11 relatively significantly changes between the state in which the nut member 11 is screwed with the bolt member 10 and the state in which the fastening thereof is released, a worker or the like can also easily visually confirm that the nut member 11 is in such a state that the fastening to the bolt member 10 is released.

Second Embodiment

Next, a chain saw according to a second embodiment of the present invention will be described.

The second embodiment is mainly different from the first embodiment in that while the relatively large stopper plate 12 formed to cover a predetermined region (the attachment region 81) of the chain cover 8 is used in the first embodiment, a stopper plate smaller than the stopper plate 12 is used in the second embodiment. Note that, in the following description, elements common to those in the first embodiment are denoted by the same reference symbols, and the functions thereof and the like are also similar to those of the first embodiment.

Figure 7:
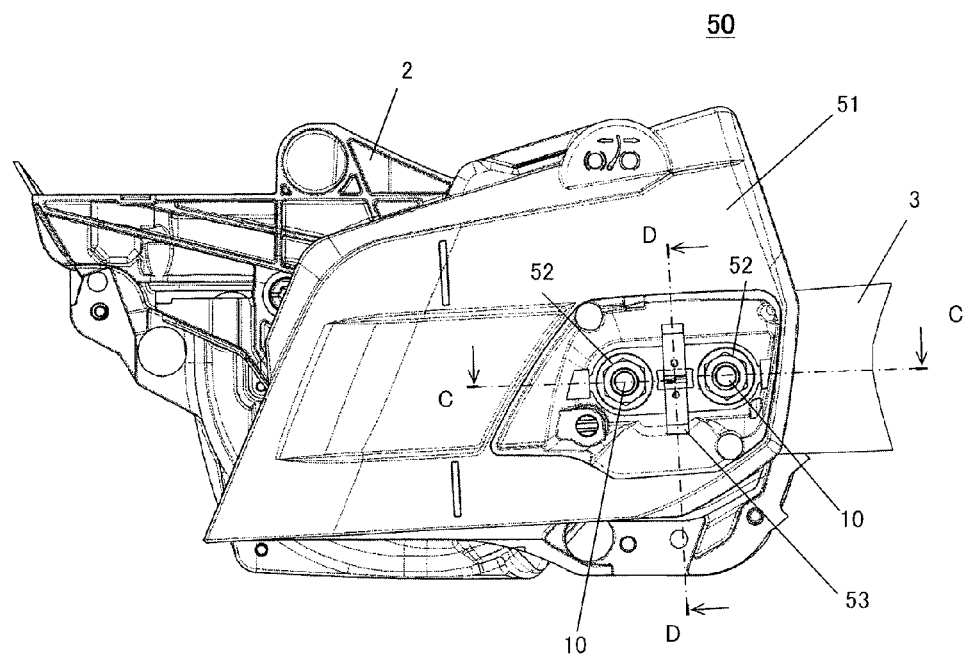
FIG. 7 is a right side view showing a main part of a chain saw according to a second embodiment.

FIG. 7 is a right side view of a relevant portion of a chain saw 50 according to the second embodiment.

As shown in FIG. 7, also in the chain saw 50 according to the second embodiment, a guide bar 3 and a chain cover 51 are fixed to a chain saw body 2 by a nut member 52 screwed with a bolt member 10 vertically provided to the chain saw body 2. Furthermore the nut member 52 of which fastening to the bolt member 10 is released is held on the outer side of the chain cover 51 by a stopper plate 53 attached to the chain cover 51 while having a predetermined gap space (a gap space S' to be described later) provided between the nut member 52 and the outer surface of the chain cover 51.

Figure 8:
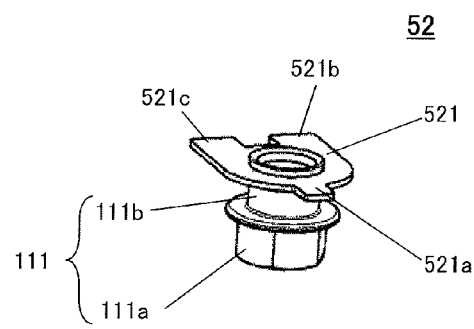
FIG. 8 is a view showing a configuration of a nut member according to the second embodiment.
Figure 9:
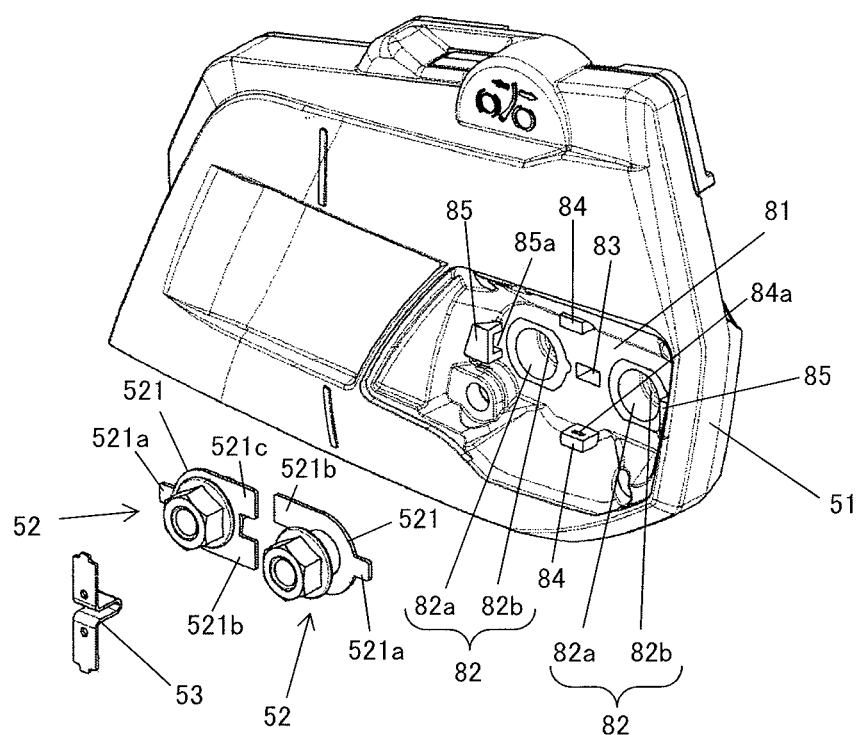
FIG. 9 is an exploded perspective view showing a chain cover assembly in the chain saw according to the second embodiment.

FIG. 8 is a view showing a configuration of the nut member 52. FIG. 9 is an exploded perspective view of a chain cover assembly (the chain cover 51, the nut member 52, and the stopper plate 53).

The nut member 52 has a nut member body 111 and a washer member 521. As in the washer member 112 in the first embodiment, the washer member 521 is mounted to a sleeve portion 111*b* so as to be prevented from dropping from the sleeve portion 111*b* and movable in an axial direction of the sleeve portion 111*b*. However, the washer member 521 in this embodiment has a tongue piece 521*a* and two tongue pieces 521*b* and 521*c*, and the tongue piece 521*a* and the tongue pieces 521*b*, 521*c* are formed on opposite sides of an insertion hole through which the sleeve portion 111*b* is inserted (see, FIGS. 8 and 9). Each of the tongue pieces 521*a* to 521*c* is formed to protrude outward of the washer member 521.

In the formation of the stopper plate 53, as an example, a die-punched sheet metal member is bent into a U shape to make the sheet metal member have a spring property and, at the same time, the sheet metal member is formed into a "substantially T shape" as viewed from the front or rear side of the chain saw 50 by folding both ends of the sheet metal member outward at substantially right angles (see, FIG. 9).

As with the chain cover 8 of the first embodiment, the outer surface of the chain cover 51 of this embodiment also has a recessed attachment region 81 in which the nut member 52 and the stopper plate 53 are attached, and the attachment region 81 has a stepped through-hole 82 (a large diameter recessed portion 82*a* and a small diameter penetrating portion 82*b*) at the bottom portion. However, in this embodiment, the attachment region 81 further has at its bottom portion an attachment hole 83 for the stopper plate 53. Furthermore, a wall portion 84 provided with an engagement groove 84*a* for the stopper plate 53 is vertically provided on each of the upper and lower sides of the bottom portion of the attachment region 81. Furthermore, a bottomed box-shaped wall portion 85 is vertically provided on each of the left and right sides of the bottom portion of the attachment region 81, and the bottomed box-shaped wall portion 85 has an opening 85*a* formed on each of inner side surfaces facing each other.

In this embodiment, the sleeve portion 111*b* of the nut member body 111 is first inserted through (inserted in) the recessed portion 82*a* of the stepped through-hole 82 of the chain cover 51, and, at the same time, the tongue piece 521*a* of the washer member 521 is inserted into the opening 85*a* of the wall portion 85, whereby the nut member 52 is mounted on the chain cover 51. After that, the stopper plate 53 is attached and fixed to the chain cover 51. Specifically, a bottom portion of a U-shaped portion of the stopper plate 53 is inserted in the attachment hole 83, and, at the same time, the both ends are inserted in the engagement grooves 84*a* of the wall portions 84 by using the spring property of the U-shaped portion, whereby the stopper plate 53 is attached and fixed to the chain cover 51. At this time, the gap space S' is formed between the outer surface of the chain cover 51 and the stopper plate 53 (see, FIGS. 10 and 11 to be described later), and the tongue pieces 521*b* and 521*c* of the washer member 521 are covered by the stopper plate 53 and arranged in the gap space S'. According to this constitution, the chain cover 51, the nut member 52, and the stopper plate 53 are integrated with each other (they become the chain cover assembly).

Also in this embodiment, the nut member 52 is not connected to any of the chain cover 51 and the stopper plate 53 and is configured to be relatively movable in a predetermined range with respect to not only the chain cover 51 but also the stopper plate 53. Note that the attachment and fixing of the chain cover assembly (the chain cover 51 integrated with the nut member 52 and the stopper plate 53) to the chain saw body 2 is similar to that in the first embodiment.

Figure 10:
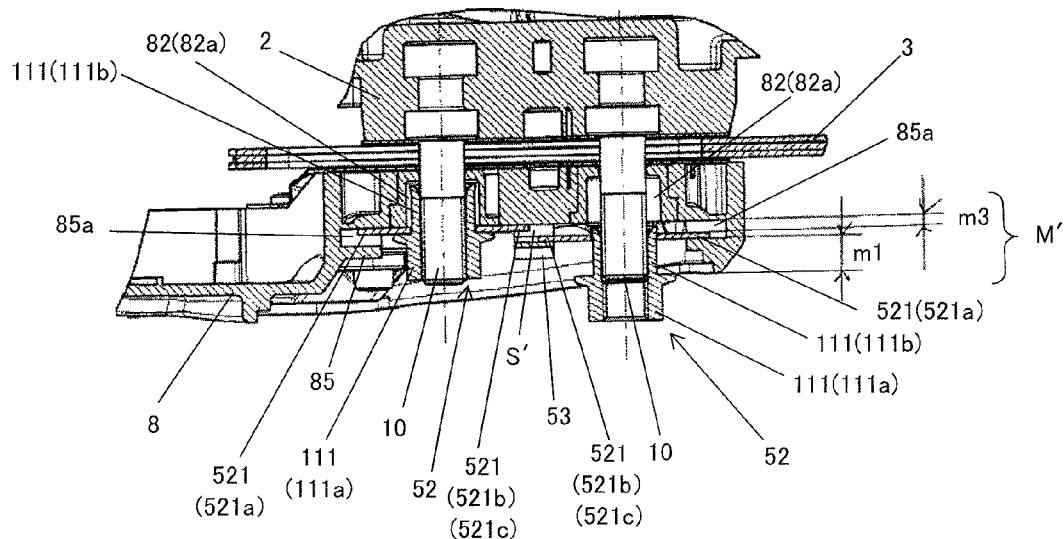
FIG. 10 is a C-C cross-sectional enlarged view of FIG. 7.
Figure 11:
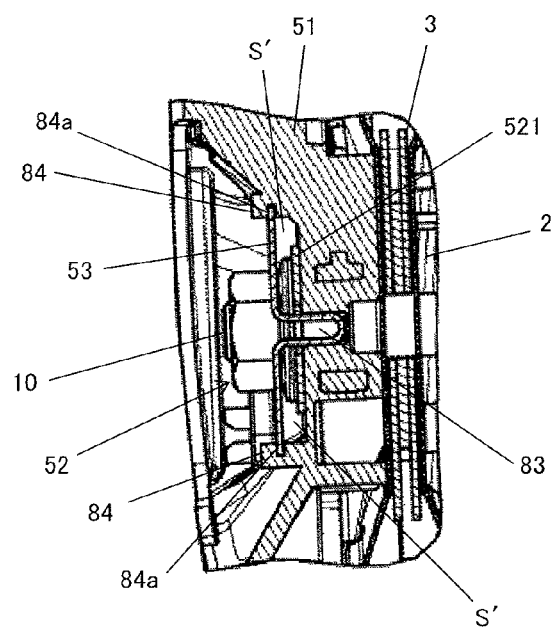
FIG. 11 is a D-D cross-sectional enlarged view of FIG. 7.

FIG. 10 is a C-C cross-sectional enlarged view of FIG. 7 and, as in FIG. 5, FIG. 10 shows a state in which the nut member 52 is fastened (left side) and a state in which the nut member 52 is loosened (right side) for illustration purposes. FIG. 11 is a D-D cross-sectional enlarged view of FIG. 7.

As described above, in the chain cover 51, the gap space S' is formed between the outer surface of the chain cover 51 and the stopper plate 53. Furthermore, the tongue piece 521*a* on one side of the washer member 521 of the nut member 52 is inserted into the opening 85*a* of the wall portion 85 formed in the chain cover 51, and the tongue pieces 521*b* and 521*c* on the other side of the washer member 521 are arranged in the gap space S'.

The chain cover 51 is attached to the chain saw body 2 in such a state in which the guide bar 3 is sandwiched between the chain cover 51 and the chain saw body 2 and fixed to the chain saw body 2 by fastening the nut member 52 (the nut member body 111) screwed with the bolt member 10. In such a state in which the nut member 52 (the nut member body 111) is fastened, the sleeve portion 111*b* of the nut member body 111 enters into the recessed portion 82*a* of the through-hole 82 while accommodating a tip end portion of the bolt member 10 therein. Furthermore, the washer member 521 is sandwiched between the outer surface of the chain cover 51 and the nut member body 111 (the nut portion 111a). In other words, the washer member 521 is located closest to the chain cover 51 side in the gap space S' (see, the left side in FIG. 10).

When the nut member 52 (the nut member body 111) is loosened, the nut member body 111 moves on the bolt member 10 in the direction away from the chain saw body 2 to release the fastening to the bolt member 10. When the fastening of the nut member 52 (the nut member body 111) to the bolt member 10 is thus released, the chain cover 51 (the chain cover assembly) can be detached from the chain saw body 2, and accompanying this, the guide bar 3 can also be detached from the chain saw body 2 (see, the right side in FIG. 10).

Also in this embodiment, when the nut member 52 (the nut member body 111) is loosened, the nut member body 111 is configured to be movable in two steps, and the two step movement includes a first movement in which the nut member body 111 moves in a state of being screwed with the bolt member 10 and a second movement in which the nut member body 111 moves in such a state in which the fastening to the bolt member 10 is released. That is, the nut member body 111 can move in the axial direction of the bolt member 10 by an amount M' (=m1+m3) obtained by adding a movable amount m3 (<m1) of the washer member 521 in the gap space S' to an amount m1 in which the nut portion 111a moves on the bolt member 10 (in other words, a length of a portion of the bolt member 10 with which the nut member body 111 can be screwed).

Then, the nut member 52 moves in two steps in the direction in which the nut member body 111 is away from the chain saw body 2, and the tongue pieces 521b and 521c of the washer member 521 are abutted against an inner surface of the stopper plate 53, whereby the nut member 52 is held to be prevented from dropping. That is, the nut member 52 of which fastening to the bolt member 10 is released is held on the outer side of the chain cover 51 (the outer side of the recessed portion 82a) by the stopper plate 53. At this time, the washer member 521 is located closest to the stopper plate 53 side (on the outer side) in the gap space S'.

Note that, in this embodiment, when the tongue pieces 521b and 521c of the washer member 521 are abutted against the inner surface of the stopper plate 53, at the substantially same time, the tongue piece 521a of the washer member 521 is configured to be abutted against an inside top surface of the opening 85a of the wall portion 85 formed in the chain cover 51, whereby the nut member 52 can be held stably. Also in this embodiment, similar effects to the first embodiment can be obtained.

Hereinabove, although the embodiments of the present invention have been described, the present invention is not limited to the above embodiments and can be variously modified and changed based on the technical concept of the present invention.

For example, although the case in which the portable working machine is the chain saw has been described in the abovementioned embodiments, the present invention is not limited to the case, and the present invention is applicable to portable working machines having a cover member detachably attached to a working machine body, and particularly, portable working machines of which components are inspected and replaced if necessary in such a state in which a cover member is detached.

As described above, the portable working machine according to the present invention is provided with a fixing member for fixing a cover member to a body of the working machine, and the fixing member of which fastening to a bolt member vertically provided to the working machine body is released is held on the outer side of the cover member by a holding member attached to an outer surface of the cover member. According to this constitution, while movement of the fixing member of which fastening to the bolt member is released is secured, drop of the fixing member is prevented. Thus, a risk of loss of the fixing member can be significantly reduced, and the workability in the detachable cover member is also enhanced.

What is claimed is:

1. A portable working machine comprising:
   a working machine body;
   at least one bolt member erected on the working machine body;
   a cover member configured to be attachable to and detachable from the working machine body, wherein the cover member has at least one through-hole through which the at least one bolt member is inserted when being attached to the working machine body;
   at least one fixing member configured to be fastened to the at least one bolt member to fix the cover member attached to the working machine body; and
   a holding member attached to an outer surface of the cover member, wherein the holding member includes at least one holding member through-hole through which the at least one fixing member passes that is configured to retain the at least one fixing member to the holding member when a fastening of the at least one fixing member to the corresponding bolt member is released to prevent the at least one fixing member from dropping off the holding member.

2. The portable working machine according to claim 1, wherein
   a predetermined gap space exists between the holding member and the outer surface of the cover member; and
   the at least one fixing member comprises:
   a fixing member body which has a nut portion formed with a female screw which corresponds to a male screw of the bolt member, and a cylindrical sleeve portion extending from the nut portion and accommodates a tip end portion of the at least one bolt member therein, and is configured to be fastened to the at least one bolt member; and
   a washer member which is mounted on the sleeve portion of the fixing member body and is configured to be movable in an axial direction of the sleeve portion and to be prevented from dropping off the sleeve portion,
   wherein the washer member is disposed in the predetermined gap space, and
   wherein the holding member is configured to retain the fixing member by holding the washer member when the fastening of the nut portion of the fixing member body to the at least one bolt member is released.

3. The portable working machine according to claim 2, wherein
   the fixing member body is configured to be movable in a direction away from the working machine body by a movable amount of the washer member in the predetermined gap space after the fastening of the fixing member body to the at least one bolt member is released.

4. The portable working machine according to claim 3, wherein
   a movable amount of the fixing member body is obtained by adding the movable amount of the washer member in the predetermined gap space to a movable amount of the nut portion on the bolt member.

5. The portable working machine according to claim 4, wherein the movable amount of the nut portion on the bolt member is greater than the movable amount of the washer member in the predetermined gap space.

6. The portable working machine according to claim 2, wherein
the holding member is configured to cover a predetermined region of the outer surface of the cover member, which includes the at least one through-hole, and the at least one holding member through-hole corresponds to the at least one through-hole of the cover member, and
a diameter of the at least one holding member through-hole is greater than an outer diameter of the nut portion and smaller than an outer diameter of the washer member.

7. The portable working machine according to claim 6, wherein
the predetermined region is formed as a recessed region having the at least one through-hole at a bottom thereof.

8. The portable working machine according to claim 1, wherein
a predetermined gap space exists between the holding member and the outer surface of the cover member that accommodates a portion of the at least one fixing member and
the holding member is configured to cover a predetermined region of the outer surface of the cover member and form a gap between the holding member and the cover member on a lower side of the cover member, wherein the gap forms a passage from the gap space to the outer surface of the cover member.

9. The portable working machine according to claim 1, wherein
the at least one bolt member is two bolt members, the at least one fixing member is two fixing members, the at least one through-hole is two through-holes, and the at least one holding member through-hole is two holding member through-holes.

10. The portable working machine according to claim 1, further comprising
a functional component disposed between the working machine body and the cover member, wherein
the at least one fixing member is configured to additionally fix the functional component to the working machine body by being fastened to the at least one bolt member.

11. The portable working machine according to claim 10, wherein
the portable working machine is a chain saw, the functional component is a guide bar guiding a saw chain, and the cover member is configured to cover at least a rear side of the guide bar.

12. The portable working machine according to claim 1, wherein a predetermined gap space exists between the holding member and the outer surface of the cover member that accommodates a portion of the at least one fixing member; and the holding member is configured to retain the at least one fixing member when the fastening of the at least one fixing member to the at least one bolt member is released in such a manner that the at least one fixing member is relatively movable, via the gap space, in a predetermined range in an axial direction of the at least one bolt member with respect to the cover member and the holding member.

13. The portable working machine according to claim 1, wherein
the cover member, the at least one fixing member, and the holding member are integrated with each other to form a cover assembly which is configured to be attachable to and detachable from the working machine body.

14. A portable working machine comprising:
a working machine body;
at least one bolt member erected on the working machine body;
a cover member configured to be attachable to and detachable from the working machine body, wherein the cover member has at least one through-hole through which the at least one bolt member is inserted when being attached to the working machine body;
at least one fixing member comprising a fixing member body which has a nut portion formed with a female screw which corresponds to a male screw of the at least one bolt member, and a cylindrical sleeve portion extending from the nut portion and accommodates a tip end of the at least one bolt member therein, and is configured to be fastened to the at least one bolt member to fix the cover member attached to the working machine body; and a washer member which is mounted on the sleeve portion of the fixing member body and is configured to be movable in an axial direction of the sleeve portion and to be prevented from dropping off the sleeve portion; and
a holding member attached to an outer surface of the cover member with a predetermined gap space between the holding member and the outer surface of the cover member, wherein the holding member, which includes at least one holding member through-hole through which the at least one fixing member passes so that the washer member is disposed in the predetermined gap space, is configured to retain the fixing member by holding the washer member on an outer side of the outer surface of the cover member when fastening of the nut portion of the fixing member body to the at least one bolt member is released to prevent that at least one fixing member from dropping off the cover member.

* * * * *